United States Patent
Ueda et al.

(10) Patent No.: US 10,319,977 B2
(45) Date of Patent: Jun. 11, 2019

(54) FASTENING SYSTEM WITH JIG RESTRICTION FLANGE

(71) Applicant: KABUSHIKI KAISHA TOYOTA JIDOSHOKKI, Aichi-ken (JP)

(72) Inventors: Hiromi Ueda, Kariya (JP); Takayuki Kato, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 263 days.

(21) Appl. No.: 15/122,762

(22) PCT Filed: Feb. 23, 2015

(86) PCT No.: PCT/JP2015/054910
§ 371 (c)(1),
(2) Date: Aug. 31, 2016

(87) PCT Pub. No.: WO2015/137097
PCT Pub. Date: Sep. 17, 2015

(65) Prior Publication Data
US 2017/0069899 A1 Mar. 9, 2017

(30) Foreign Application Priority Data
Mar. 12, 2014 (JP) .................. 2014-048779

(51) Int. Cl.
*F16B 35/04* (2006.01)
*H01M 2/20* (2006.01)
(Continued)

(52) U.S. Cl.
CPC .......... *H01M 2/206* (2013.01); *F16B 35/042* (2013.01); *H01M 2/1072* (2013.01);
(Continued)

(58) Field of Classification Search
None
See application file for complete search history.

(56) References Cited

U.S. PATENT DOCUMENTS 2,437,344 A * 3/1948 Behlmann ............ H01B 17/145
174/161 F
2,444,046 A * 6/1948 Jacobs ..................... H01M 2/20
429/164
(Continued)

FOREIGN PATENT DOCUMENTS

JP 57-38911 3/1982
JP 63-89414 6/1988
JP 5-205791 8/1993

OTHER PUBLICATIONS

JP05-205791A English translation (Year: 1993).*
(Continued)

*Primary Examiner* — Lucas J. O'Donnell
(74) *Attorney, Agent, or Firm* — Greenblum & Bernstein, P.L.C.

(57) ABSTRACT

A fastening member includes a column member, a first screw, and a second screw. The column member has a first end and a second end in the axial direction. The first screw is provided at the first end. The second screw is provided at the second end. The column member is configured so that a jig is axially fitted thereover from the second end, and so that rotating the jig having been fitted over the column member engages the first screw with a first body to be fastened. The first screw and the second screw have different axial lengths. The column member has a protrusion which prevents the jig from being fitted from the first end over the column member up to a position at which the jig can rotate the column member.

13 Claims, 4 Drawing Sheets

(51) Int. Cl.
*H01M 2/10* (2006.01)
*H01M 2/30* (2006.01)
*H01R 4/34* (2006.01)

(52) U.S. Cl.
CPC ........... *H01M 2/1077* (2013.01); *H01M 2/20* (2013.01); *H01M 2/30* (2013.01); *H01R 4/34* (2013.01)

(56) References Cited

U.S. PATENT DOCUMENTS 3,345,452 A * 10/1967 Logan ................... H01R 4/00
174/71 R
2012/0264007 A1* 10/2012 Sasaki ................ H01M 2/043
429/182

OTHER PUBLICATIONS

International Search Report, along with English-language translation thereof, for PCT/JP2015/054910 dated Mar. 17, 2015.
English-language translation of International Preliminary Report on Patentability issued in PCT/JP2015/054910 and dated Sep. 13, 2016.

* cited by examiner

FASTENING SYSTEM WITH JIG RESTRICTION FLANGE

TECHNICAL FIELD

The present invention relates to a fastener that is configured to fasten fastened bodies to two axial ends of a post.

BACKGROUND ART

Patent Document 1 discloses a fastener configured to fasten two types of fastened bodies (bus bars) to two axial ends of a post (press-fitting component), respectively.

PRIOR ART DOCUMENT

Patent Document

Patent Document 1: Japanese Laid-Open Patent Publication No. 5-205791

SUMMARY OF THE INVENTION

Problems that are to be Solved by the Invention

In the fastener of Patent Document 1, different types of fastened bodies are respectively fastened to screws arranged on a first axial end and a second axial of a post. Thus, when the two screws have different lengths in accordance with the types of the fastened bodies, a fastened body that is to be fastened to the second end of the post may be erroneously fastened to the first end. In such a case, the screw on the first end would be too long or too short.

It is an object of the present invention to provide a fastener that obviates erroneous fastening of a fastened body.

Means for Solving the Problem

A fastener that solves the above problem includes a post including a first end and a second end in an axial direction, a first screw arranged on the first end and configured to be fastened to a first fastened body, and a second screw arranged on the second end and configured to be fastened to a second fastened body. The post is configured so that a jig is fitted to the post from the second end in the axial direction, and the jig fitted to the post is rotated so that the first screw is engaged with the first fastened body. The first screw and the second screw have different axial lengths. The post includes a flange that restricts the fitting of the jig to the post from the first end to a position that allows the jig to rotate the post.

EMBODIMENTS OF THE INVENTION

First Embodiment

A fastener 31 of a first embodiment will now be described.

Figure 1:
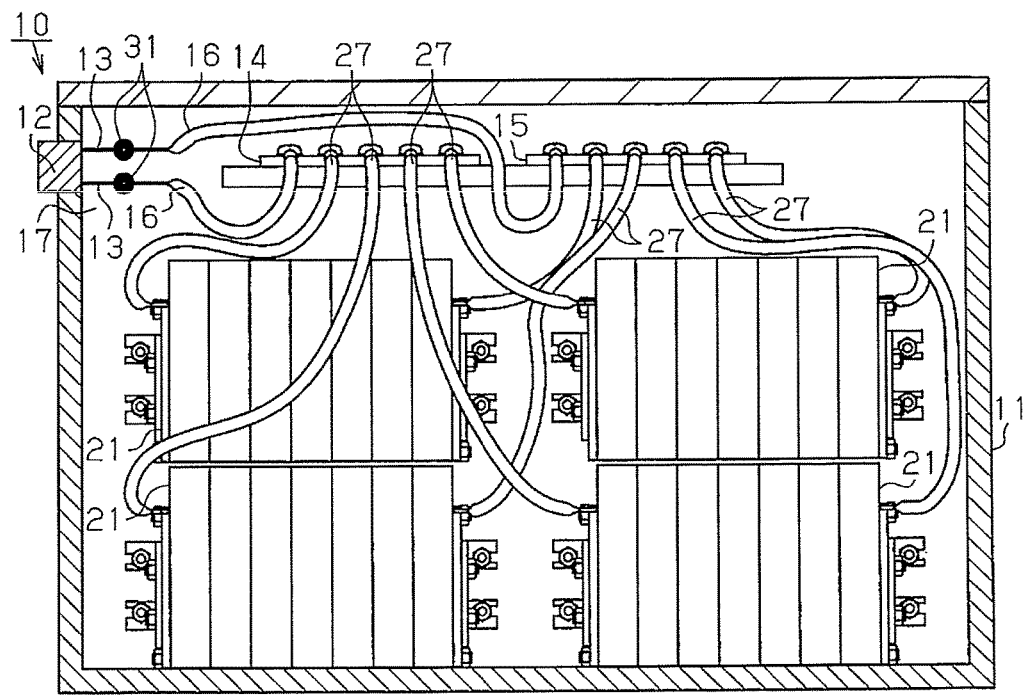
FIG. 1 is a front view showing a first embodiment of a battery pack.

As shown in FIG. 1, a battery pack 10 includes a housing 11. The housing 11 accommodates battery modules 21. The housing 11 includes a connector 12 to which an external connection device (for example, charger or load) is connected. A plurality of (two in the present embodiment) output harnesses 13 are connected to the connector 12.

Figure 2:
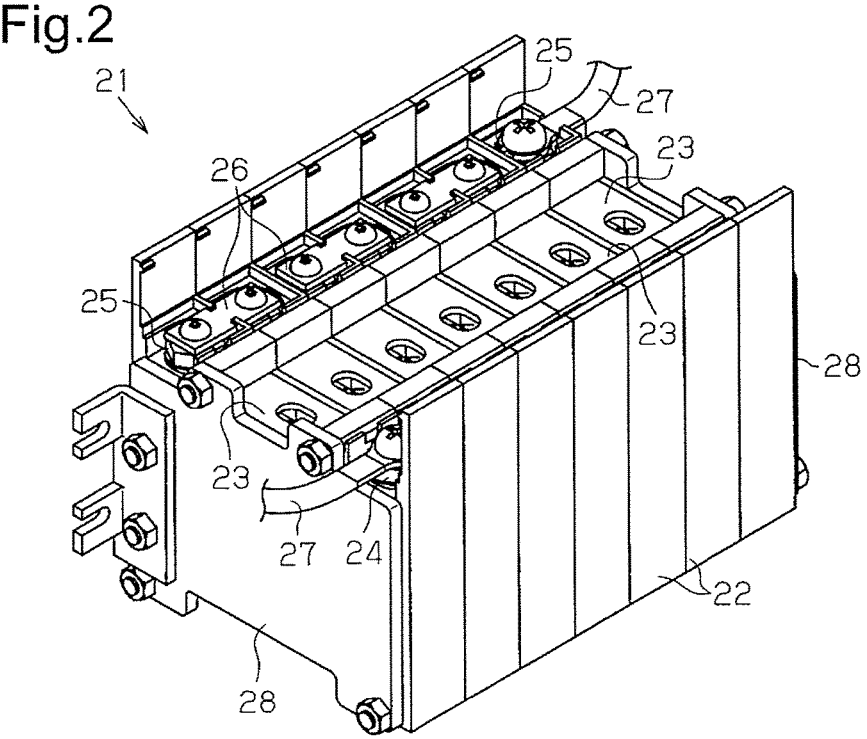
FIG. 2 is a perspective view of a battery module shown in FIG. 1.

As shown in FIG. 2, each of the battery modules 21 includes battery holders 22 and battery cells 23. Each battery cell 23 is held by the corresponding battery holder 22 and includes a positive electrode terminal 24 and a negative electrode terminal 25. The battery cells 23 are laid out in a row, and the battery module 21 includes end plates 28 arranged at the two ends in the layout direction of the battery cells 23. The end plates 28 hold the battery cells 23. The battery cells 23 are arranged so that the positive electrode terminal 24 of one of two battery cells 23 that are adjacent in the layout direction is arranged adjacent to the negative electrode terminal 25 of the other one of the battery cells 23, and the positive electrode terminal 24 and the negative electrode terminal 25 that are adjacent to each other are connected by a bus bar 26. This connects the battery cells 23 in series. Connection harnesses 27 are connected to the battery cells 23 located at the two ends in the layout direction.

As shown in FIG. 1, a first terminal base 14 and a second terminal base 15 are arranged inside the housing 11. The two connection harnesses 27 extending from each battery module 21 are connected to the first terminal base 14 and the second terminal base 15, respectively. Each of the terminal bases 14 and 15 is connected to the connection harnesses 27 of the same polarity. Thus, the battery modules 21 are connected in parallel.

Harnesses 16, which are electrically connected to the output harnesses 13, are connected to the terminal bases 14 and 15. Each harness 16 is fixed by the corresponding fastener 31, which is arranged in the housing 11, to the corresponding output harness 13 in contact with the output harness 13. This electrically connects each harness 16 to the corresponding output harness 13. The harnesses 16 are electrically connected to the battery cells 23 by the terminal bases 14 and 15 and the connection harnesses 27.

Figure 3:
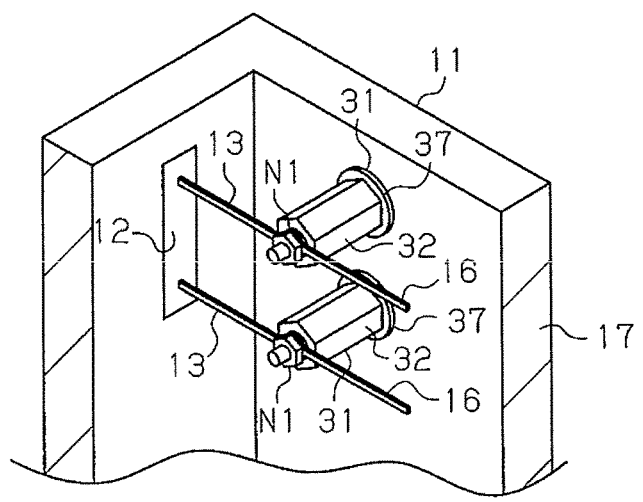
FIG. 3 is a perspective view of a fastener shown in FIG. 1.
Figure 4:
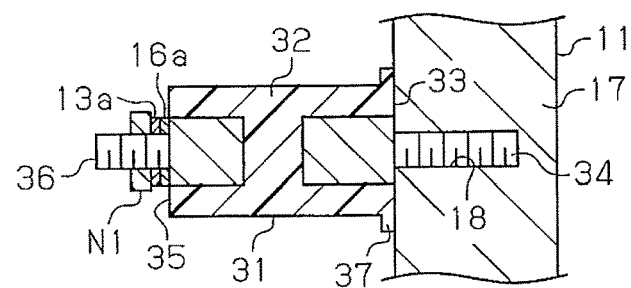
FIG. 4 is a cross-sectional view of the fastener shown in FIG. 3.

As shown in FIG. 3, a plurality of (two in the present embodiment) fasteners 31 are arranged on a wall 17 of the housing 11. Each fastener 31 includes a hexagonal post 32. As shown in FIG. 4, the post 32 includes a first end 33 and a second end 35 in the axial direction. A first screw 34 is arranged on the first end 33, and a second screw 36 is arranged on the second end 35. The post 32 is formed from a resin, and the first screw 34 and the second screw 36 are formed from a metal. The first screw 34 is insulated from the second screw 36 by the post 32. The axial length of the first screw 34 is greater than the axial length of the second screw 36. The first end 33 of the fastener 31 includes an annular flange 37, which is flanged in a direction intersecting the axial direction of the fastener 31 (more specifically, radial direction of fastener 31), extending along the entire circumference of the post 32.

As shown in FIG. 4, the first screw 34 is configured to be fastened to a first fastened body, namely, the wall 17 of the housing 11, and the second screw 36 projects into the housing 11 when the first screw 34 is fastened to the wall 17. The wall 17 of the housing 11 includes a threaded hole 18, and the wall surface of the threaded hole 18 is threaded. When the first screw 34 is engaged with the threaded hole 18, the first screw 34 is fastened to the wall 17. A U-shaped connection metal fitting 16a is arranged on the end of each harness 16, and a U-shaped connection metal fitting 13a is arranged on the end of each output harness 13. The connection metal fitting 16a of the harness 16 and the connection metal fitting 13a of the output harness 13 are arranged over each other around the second screw 36. When a second fastened body, namely, a nut N1 is fastened to the second screw 36 and the two connection metal fittings 13a and 16a are pressed toward the post 32 by the nut N1, the output harness 13 is electrically connected to the harness 16 and fixed to the fastener 31.

The axial length of the first screw 34 is substantially equal to the depth of the threaded hole 18, and the relationship of the axial length of the first screw 34 and the depth of the threaded hole 18 is at least set so that the fastener 31 withstands tilting when vibration or the like occurs. When the first screw 34 is too long or too short in the axial direction with respect to the depth of the threaded hole 18, the fastener 31 is apt to be tilted when vibration occurs. The axial length of the first screw 34 may be greater than the depth of the threaded. hole 18 as long as the fastener 31 is not tilted when vibration or the like occurs.

The axial length of the second screw 36 is set to be at least the sum of the thickness of the connection metal fitting 13a, the thickness of the connection metal fitting 16a, and one-half of the axial length of the through hole of the nut N1. When the second screw 36 is too long in the axial direction, the projection length of the second screw 36 increases. This may interfere with the arrangement of the objects that are accommodated in the housing 11. Further, when the axial length of the second screw 36 is smaller than the sum of the thickness of the connection metal fitting 13a, the thickness of the connection metal fitting 16a, and one-half of the axial length of the through hole of the nut N1, the nut N1 may separate from the first screw 36. As long as the nut N1 does not separate from the first screw 36, the axial length of the second screw 36 may be less than the sum of the thickness of the connection metal fitting 13a, the thickness of the connection metal fitting 16a, and one-half of the axial length of the through hole of the nut N1.

As described above, the lengths of the first screw 34 and the second screw 36 are set to satisfy the above conditions. Further, the first screw 34 and the second screw 36 have different lengths.

Figure 5A:
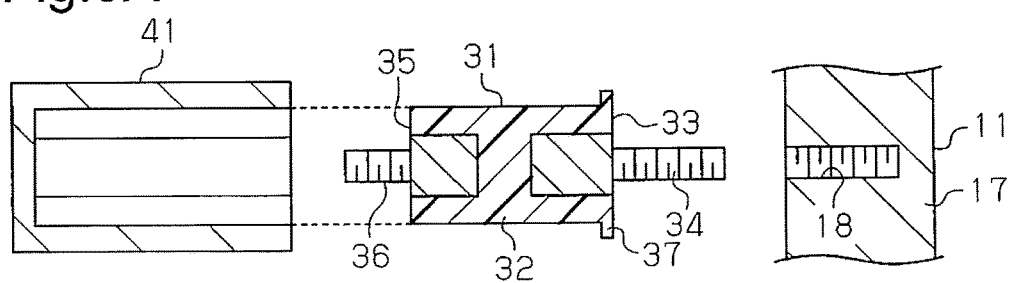
FIGS. 5A and 5B are cross-sectional views each showing the fastener of FIG. 3.

As shown in FIG. 5A, when fastening the housing 11 and the nut N1 to the fastener 31, the first screw 34 is first fastened to the wall 17 of the housing 11. When the first screw 34 is fastened to the wall 17, a jig 41 is fitted to the post 32 from the second end 35 in the axial direction, and the jig 41 is rotated. The rotation of the jig 41 rotates the first screw 34 integrally with the post 32 and fastens the first screw 34 to the threaded hole 18 of the wall 17. The jig 41 has the form of a hexagonal tube. The diagonals of the hexagon of the inner surface of the jig 41 are slightly larger than the diagonals of the hexagonal post 32 and smaller than the outer diameter of the annular flange 37.

The operation of the fastener 31 of the present embodiment will now be described.

As shown in FIGS. 4 and 5A, the first screw 34 is first fastened to the wall 17 of the housing 11 using the jig 41. After the first screw 34 is fastened to the wall 17 of the housing 11, the nut N1 is fastened to the second screw 36 to fix the connection metal fitting 16a of the harness 16 and the connection metal fitting 13a of the output harness 13 to the fastener 31.

Figure 5B:
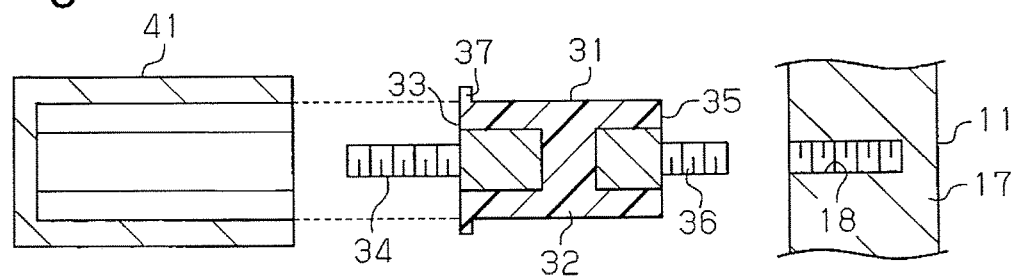

Referring to FIG. 5B, when fixing the fastener 31 to the housing 11, if the jig 41 is fitted to the post 32 from the first end 33, the flange 37 restricts the fitting of the jig 41 to the post 32. Thus, when the fastener 31 is coupled to the wall 17 of the housing 11 using the jig 41, only the fastening of the first screw 34 to the wall 17 is allowed.

Accordingly, the above embodiment has the advantages described below.

(1) The flange 37 restricts the fitting of the jig 41 to the post 32 from the first end 33 and obviates the fastening of the second screw 36 to the wall 17 of the housing 11. This obviates erroneous fastening of the nut N1 to the first screw 34 and erroneous fastening of the second screw 36 to the wall 17 of the housing 11.

(2) Since the post 32 is formed from a resin, the first screw 34 is electrically insulated from the second screw 36. This limits short-circuiting of the battery cells 23.

Second Embodiment

A fastener 81 of a second embodiment will now be described.

Figure 6:
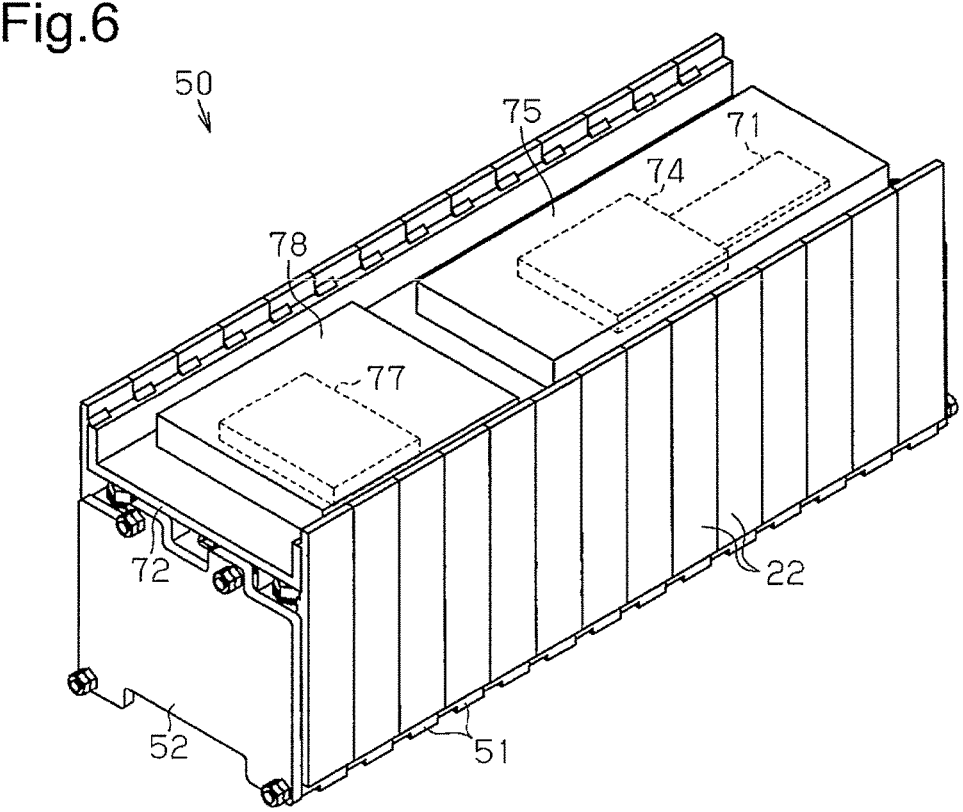
FIG. 6 is a perspective view showing a second embodiment of a battery module.
Figure 7A:
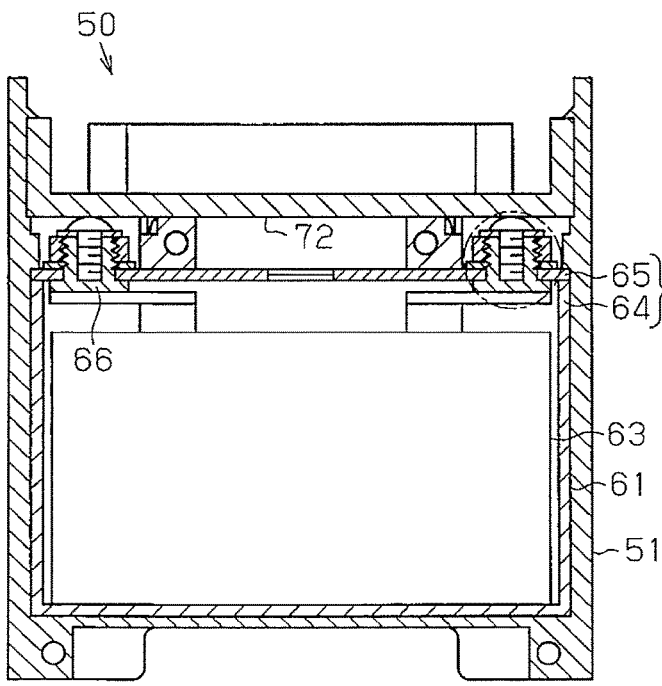
FIG. 7A is a cross-sectional view of the battery module shown in FIG. 6.
Figure 7B:
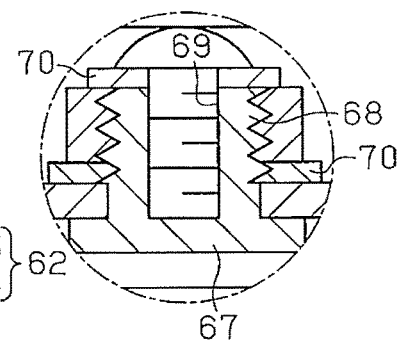
FIG. 7B is a partially enlarged cross-sectional view of FIG. 7A.

As shown in FIGS. 6, 7A, and 7B, a battery module 50 includes battery holders 51 and battery cells 61. Each battery cell 61 is held by the corresponding battery holder 22 and includes a positive electrode terminal 66 and a negative electrode terminal 67. The battery cells 61 are laid out in a row, and the battery module 50 includes end plates 52 arranged at the two ends in the layout direction of the battery cells 61.

Each battery cell 61 includes a battery case 62 and an electrode assembly 63, which is accommodated in the battery case 62. The battery case 62 includes a box-shaped case body 64, which includes a bottom wall and an opening, and a flat lid 65 that closes the opening of the case body 64. The positive electrode terminal 66 and the negative electrode terminal 67 project out of the lid 65. The positive electrode terminal 66 and the negative electrode terminal 67 each include a rod 68 exposed to the outside of the battery case 62. Further, the positive electrode terminal 66 and the negative electrode terminal 67 each include a threaded hole 69 extending in the axial direction from an end of the rod 68 that is exposed from the battery case 62. The wall surface of each of the threaded holes 69 is threaded.

The battery cells 61 are arranged so that the positive electrode terminal 66 of one of two battery cells 61 that are adjacent in the layout direction is arranged adjacent to the negative electrode terminal 67 of the other one of the battery cells 61, and the positive electrode terminal 66 and the negative electrode terminal 67 that are adjacent to each other are connected by a bus bar 70. This connects the battery cells 61 in series.

The row of the battery holders 51 holds a mounting plate 72 on which electronic components and the like are mounted. The mounting plate 72 extends in the layout direction of the battery cells 61. A relay 74 that controls discharging and discharging interruption of the battery cells 61 is mounted on the mounting plate 72. The relay 74 is covered by a box-shaped relay cover 75. A flat bus bar 71 connected to the relay 74 is arranged in the relay cover 75. A battery ECU 77 that controls the battery cells 61 is mounted on the mounting plate 72. The battery ECU 77 is covered by a box-shaped ECU cover 78.

Figure 8A:
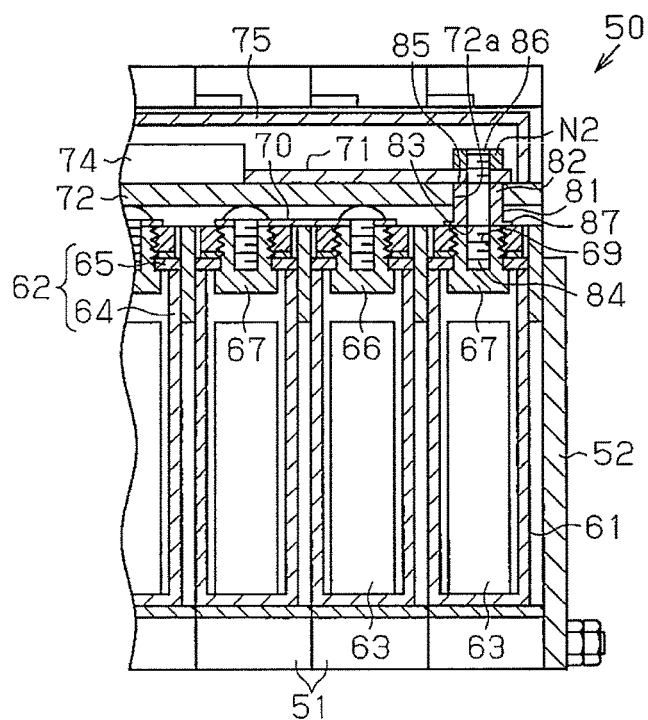
FIG. 8A is a partially cutaway, cross-sectional view of the battery module shown in FIG. 6.
Figure 8B:
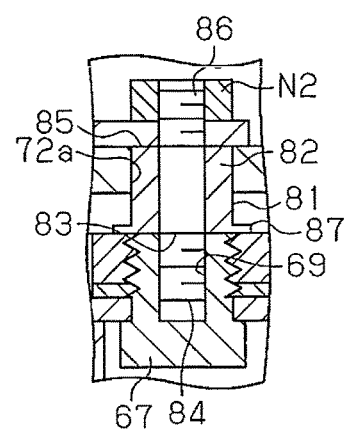
FIG. 8B is an enlarged cross-sectional view of a fastener shown in FIG. 8A.

As shown in FIGS. 8A and 8B, the mounting plate 72 includes a through hole 72a. The fastener 81 is inserted through the through hole 72a and electrically connects one of two battery cells 61 arranged at the two ends in the layout direction to the flat bus bar 71. The fastener 81 of the present embodiment includes a hexagonal post 82 including a first end 83 and a second end 85 in the axial direction, a first screw 84 arranged on the first end 83, and a second screw 86 arranged on the second end 85. The post 82, the first screw 84, and the second screw 86 are each formed from a metal. The first screw 84 is longer in the axial direction than the second screw 86. The first end 83 of the post 82 includes an annular flange 87, which is flanged in the radial direction along the end surface of the first end 83.

The first screw 84 is fastened to (engaged with) a first fastened body, namely, the threaded hole 69 of the negative electrode terminal 67 of the battery cell 61. A second fastened body, namely, a nut N2 is fastened to (engaged with) a portion of the second screw 86 that projects from the flat bus bar 71.

The axial length of the first screw 84 is substantially equal to the depth of the threaded hole 69 of the negative electrode terminal 67, and the axial length of the first screw 84 and the depth of the threaded hole 69 are set so that at least tilting of the fastener 81 caused by vibration or the like does not occur. When the first screw 84 is too long or too short in the axial direction with respect to the depth of the threaded hole 69, the fastener 81 is apt to be tilted by vibration. Further, when the first screw 84 is too short in the axial direction, the area of contact is small between the first screw 84 and the negative electrode terminal 67. This increases the resistance at the contact portion. The first screw 84 may be longer or shorter in the axial direction than the depth of the threaded hole 69 as long as the fastener 81 is not tilted by vibration or the like and the area of contact is sufficient between the first screw 84 and the negative electrode terminal 67.

When the second screw 86 is too long in the axial direction, the height of the relay cover 75 (length of side surface of relay cover 75 extending parallel to axial direction of fastener 81) increases. This enlarges the entire battery module 50. When the axial length of the second screw 86 is less than the sum of the thickness of the flat bus bar 71 and one-half of the depth of a through hole of the nut N2, the nut N2 may separate from the second screw 86. Thus, the axial length of the second screw 86 is set to be at least the sum of the thickness of the flat bus bar 71 and one-half of the depth of the through hole of the nut N2. As long as the nut N2 does not separate from the second screw 86, the axial length of the second screw 86 may be less than the sum of the thickness of the flat bus bar 71 and one-half of the depth of the through hole of the nut N2.

The operation of the fastener 81 of the present embodiment will now be described.

After the first screw 84 is fastened to the threaded hole 69 of the negative electrode terminal 67 using the same jig 41 as the first embodiment, the nut N2 is fastened to the second screw 86. In this case, the flange 87 restricts fitting of the jig 41 to the post 82 from the first end 83.

Accordingly, the present embodiment has the advantages described below.

(3) The flange 87 restricts fitting of the jig 41 from the first end 83. This obviates fastening of the nut N2 to the first screw 84 and fastening of the second screw 86 to the negative electrode terminal 67.

(4) The post 82, the first screw 84, and the second screw 86 are each formed from a metal. This allows the fastener 81 to electrically connect the battery cell 61 and the flat bus bar 71.

The embodiments may be modified as follows.

Figure 9A:
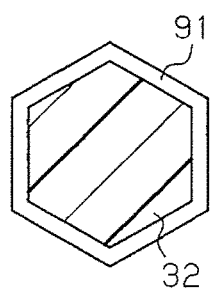
FIGS. 9A to 9C are cross-sectional views each showing a fastener of a modified example.
Figure 9B:
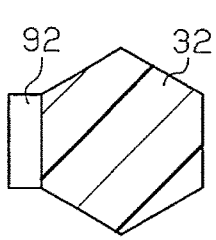
Figure 9C:
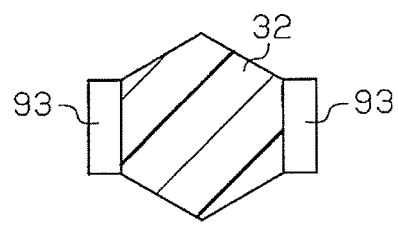

The flange does not have to be annular. A flange 91 may have the form of a polygon such as a hexagon, as shown in FIG. 9A. Alternatively, a flange 92 may extend from part of the outer circumference of the post 32 or 82, as shown in FIG. 9B. As another option, flanges 93 may extend from multiple portions of the outer circumference of the post 32 or 82, as shown in FIG. 9C.

The post 32 or 82 may have another polygonal form such as a pentagonal form.

In each of the embodiments, the flange 37 or 87 may be located slightly toward the second end 35 or 85 from the first end 33 or 83 of the post 32 or 82. In this case, although the jig 41 may be slightly fitted to the post 32 or 82 from the first end 33 or 83, the flange 37 or 87 only needs to be located at a position where the flange 37 or 87 does not allow the post 32 or 82 to rotate integrally with the second screw 36 or 86 when the jig 41 is rotated. That is, the flange 37 or 87 only needs to restrict fitting of the jig 41 from the first end 33 or 83 to a position where the flange 37 or 87 allows the post 32 or 82 to rotate. In other words, the flange 37 or 87 functions as a restriction portion that restricts fastening of the jig 41 to the first end 33 or 83 of the post 32 or 82.

In each of the embodiments, the first screw 34 or 84 may be shorter in the axial direction than the second screw 36 or 86.

In the second embodiment, the fastener 81 may be fastened to the positive electrode terminal 66.

The invention claimed is:

1. A fastening system comprising:
   a first fastened body;
   a second fastened body; and
   a fastener including:
      a post including a first end and a second end in an axial direction;
      a first screw extending from the first end and fastened to the first fastened body, the first screw having a thread formed only on a portion of the first screw that is exposed outside the post; and
      a second screw extending from the second end and fastened to the second fastened body, the second screw having a thread formed only on a portion of the second screw that is exposed outside the post, wherein
   the post is configured so that a jig is fitted to the post from the second end in the axial direction, and the jig fitted to the post is rotated so that the first screw is engaged with the first fastened body,
   the first screw and the second screw are coaxial with each other and have different axial lengths,
   the post includes a flange that restricts the fitting of the jig to the post from the first end to a position that allows the jig to rotate the post,
   the post is an insulative resin, and
   one of the first fastened body and the second fastened body is a nut used to fix a harness that is electrically connected to a battery cell, and the other one of the first fastened body and the second fastened body is a housing that accommodates the battery cell.

2. The fastening system according to claim 1, wherein the first fastened body is the housing, and the second fastened body is the nut.

3. A fastening system comprising:
a first fastened body;
a second fastened body; and
a fastener including:
   a post including a first end and a second end in an axial direction;
   a first screw extending from the first end and fastened to the first fastened body, the first screw having a thread formed only on a portion of the first screw that is exposed outside the post; and
   a second screw extending from the second end and fastened to the second fastened body, the second screw having a thread formed only on a portion of the second screw that is exposed outside the post, wherein
the post is configured so that a jig is fitted to the post from the second end in the axial direction, and the jig fitted to the post is rotated so that the first screw is engaged with the first fastened body,
the first screw and the second screw are coaxial with each other and have different axial lengths,
the post includes a flange that restricts the fitting of the jig to the post from the first end to a position that allows the jig to rotate the post,
the post is an insulative resin to electrically insulate the first screw from the second screw, and
one of the first fastened body and the second fastened body is a nut used to fix an electric conductor, which is electrically connected to a battery cell, to the fastener.

4. A fastening system comprising:
a first fastened body;
a second fastened body; and
a fastener including:
   a post including a first end and a second end in an axial direction;
   a first screw extending from the first end and fastened to the first fastened body, the first screw having a thread formed only on a portion of the first screw that is exposed outside the post; and
   a second screw extending from the second end and fastened to the second fastened body, the second screw having a thread formed only on a portion of the second screw that is exposed outside the post, wherein
the post is configured so that a jig is fitted to the post from the second end in the axial direction, and the jig fitted to the post is rotated so that the first screw is engaged with the first fastened body,
the first screw and the second screw are coaxial with each other and have different axial lengths,
the post includes a flange that restricts the fitting of the jig to the post from the first end to a position that allows the jig to rotate the post,
the post, the first screw, and the second screw are formed from a metal,
the first fastened body is a battery cell, and the second fastened body is a nut used to fix an electric conductor to the fastener to electrically connect the electric conductor to the battery cell.

5. The fastening system according to claim 1, wherein the flange extends annularly along an entire circumference of the post.

6. The fastening system according to claim 5, wherein the post has a polygonal form, and the flange has a polygonal form.

7. The fastening system according to claim 1, wherein the flange is at least one flange extending from part of an outer circumference of the post.

8. The fastening system according to claim 3, wherein the flange extends annularly along an entire circumference of the post.

9. The fastening system according to claim 8, wherein the post has a polygonal form, and the flange has a polygonal form.

10. The fastening system according to claim 3, wherein the flange is at least one flange extending from part of an outer circumference of the post.

11. The fastening system according to claim 4, wherein the flange extends annularly along an entire circumference of the post.

12. The fastening system according to claim 11, wherein the post has a polygonal form, and the flange has a polygonal form.

13. The fastening system according to claim 4, wherein the flange is at least one flange extending from part of an outer circumference of the post.

* * * * *